US005688064A

United States Patent [19]

Shanks

[11] Patent Number: 5,688,064

[45] Date of Patent: Nov. 18, 1997

[54] METHOD AND APPARATUS FOR COUPLING BULB STEM TO ROTATABLE MOTOR SHAFT

[75] Inventor: Bruce Shanks, Gaithersburg, Md.

[73] Assignee: Fusion Lighting, Inc., Rockville, Md.

[21] Appl. No.: 738,661

[22] Filed: Oct. 30, 1996

[51] Int. Cl.$^6$ ............................... F21V 19/00; F16B 7/18

[52] U.S. Cl. ............................... 403/24; 403/22; 403/11; 403/300; 362/286

[58] Field of Search ............................... 403/22, 11, 306, 403/307, 301, 302, 24; 362/35, 285, 286

[56] References Cited

U.S. PATENT DOCUMENTS

| | | | |
|---|---|---|---|
| 4,752,151 | 6/1988 | Ashida et al. | 403/307 X |
| 4,921,429 | 5/1990 | Brown | 362/35 X |
| 5,269,621 | 12/1993 | De Bortoli et al. | 402/22 X |
| 5,404,076 | 4/1995 | Dolan et al. | 313/572 |
| 5,447,030 | 9/1995 | Wang et al. | 403/22 X |
| 5,570,549 | 11/1996 | Lung et al. | 403/306 X |

*Primary Examiner*—Anthony Knight

[57] ABSTRACT

An inexpensive and reliable method and apparatus for selectively coupling the bulb stem of an electrodeless lamp to a rotatable drive shaft does not require side access to a set screw or an RF sealing arrangement. The coupler accommodates angular and eccentric misalignment of threadedly engageable members at relatively low manufacturing costs. A cylindrical coupler connected to the bulb stem is provided with a cylindrical cross-hole extending diametrically through and exposing the proximal end of the bulb stem in the longitudinal bore. A seating lock nut of generally rectangular configuration, and having a pair of opposite compressible turned out corners or "wings", is insertable through the cross-hole and is loosely retained at the intersection of the bore and cross-hole. The seating lock nut is sized, relative to the cross-hole and longitudinal bore, such that, upon being released within the cross-hole, the lock nut is loosely retained. The distal tip of the drive shaft is pointed to facilitate its entry into threaded aperture formed by bendable tongue members of the loosely retained seating lock nut. Rearwardly of its pointed end, the drive shaft is threaded to engage the nut threaded aperture. The resilient metal seating lock nut tends to deform at its bent tongues when the shaft threaded segment "bottoms out" during insertion. This deformation provides a locking function, causing the motor shaft to pull on the tongues of the lock nut, resulting in the elimination of any clearance between the two threaded members and thus creating a compressive prestress on the overall joint.

14 Claims, 2 Drawing Sheets

METHOD AND APPARATUS FOR COUPLING BULB STEM TO ROTATABLE MOTOR SHAFT

BACKGROUND OF THE INVENTION

1. Technical Field

The present invention pertains to microwave powered electrodeless lamps and, in particular, to an improved method and apparatus for mounting the stem of an electrodeless bulb on the drive shaft of a motor.

2. Discussion of the Prior Art

Lamps using radio frequency (RF) energy to excite electrodeless bulbs are well known. In lamps of this type, microwave energy is coupled from a magnetron or other RF source to the lamp bulb via a waveguide feeding a quasi-resonant microwave cavity in which the discharge envelope of the bulb is supported on a bulb stem. In some embodiments of these lamps the bulb stem is rotated about its axis by a motor, located outside the cavity, to in turn rotate and cool the discharge envelope of the bulb. Couplings between the bulb stem and the motor drive shaft have taken a variety of forms, one of which utilizes a generally cylindrical coupling member having a central longitudinal bore, the bulb stem extending into one end of that bore where it is fixedly secured to the coupling member by suitable cement. The motor drive shaft closely fits into the opposite end of the coupling member and is secured therein by means of one or more set screws disposed in threaded holes extending radially through the coupling member wall into communication with the longitudinal bore. In order to provide manual access to the set screw holes, passageways for screw drivers, or the like, must be defined through the assembly housing. Such access passageways must be appropriately sealed to prevent communication between the microwave cavity and the environment surrounding the lamp assembly. Both the access passageways and the seal arrangement have significant adverse effects on the manufacturing costs of the assembly.

It is desirable, therefore, to provide a reliable mechanical connection between the motor drive shaft and the bulb stem coupler. Simply threading the interior of the coupler for direct engagement with mating threads on the drive shaft is not a suitable solution. Specifically, such an arrangement requires very close tolerances for the threaded members in order to preclude angular or eccentric misalignment of the drive shaft and coupler. Such close tolerances in threadedly engageable components result in prohibitive manufacturing costs.

OBJECTS AND SUMMARY OF THE INVENTION

It is therefore an object of the present invention to provide an inexpensive and reliable method and apparatus for selectively coupling the bulb stem of an electrodeless lamp to a rotatable drive shaft. It is a further object of the present invention to provide such method and apparatus without requiring access and sealing arrangements that increase manufacturing costs. It is also an object of the invention to provide such a method and apparatus which accommodates angular and eccentric misalignment of threadedly engageable members at relatively low manufacturing costs.

In accordance with the present invention the cylindrical coupler connected to the bulb stem is provided with a cylindrical cross-hole extending diametrically therethrough and exposing the proximal end of the bulb stem in the longitudinal bore. A seating lock nut of generally rectangular configuration, and having a pair of opposite compressible turned out corners or "wings", is insertable through the cross-hole and is loosely retained at the intersection of the bore and cross-hole. Specifically, the seating lock nut is sized, relative to the cross-hole and longitudinal bore, such that, upon being released within the cross-hole, the lock nut is loosely retained therein. The resilient turned out corners or wings of the lock nut extend longitudinally a shod distance along opposite sides of the end of the bulb stem, thereby preventing the nut from being moved transversely, relative to the longitudinal bore, out of the cross-hole. The walls of the cross-hole limit both rotation and tilting of the seating lock nut about the axes of the longitudinal bore and the cross-hole.

The distal tip of the drive shaft is generally conical or otherwise pointed to facilitate its entry into a threaded aperture formed by bendable tongue members of the loosely retained seating lock nut. Rearwardly of its pointed end, the drive shaft is threaded to engage that threaded aperture. The loose retention of the seating lock nut in the longitudinal bore and cross-hole allows the nut thread segment to "float" with respect to the cylindrical coupling member interior to thereby allow for both angular and eccentric misalignment of the threading relative to the cylindrical portion of the motor drive shaft. The annular clearance between the two cylindrical portions, on the other hand, which can be inexpensively held to very high tolerances, is kept quite low, on the order of a few ten thousandths of an inch, so as to assure repeatability in positioning the bulb. The tapered drive shaft tip assures entry into the threaded hole of the lock nut during the process of engaging the drive shaft and coupler.

The resilient metal seating lock nut tends to deform at its bent tongues and wings when the stem shaft threaded segment "bottoms out" during insertion. This deformation provides a locking function, causing the motor shaft to pull on the tongues of the seating lock nut, resulting in the elimination of any clearance between the two threaded members and thereby creating a compressive pre-stress on the overall joint.

These and other objects, features and advantages of the present invention will become apparent upon consideration of the following detailed description of specific embodiments thereof, particularly when taken in consideration with the accompanying drawings wherein like reference numerals in the various figures are utilized to designate like components.

DESCRIPTION OF THE PREFERRED EMBODIMENTS

Figure 1:
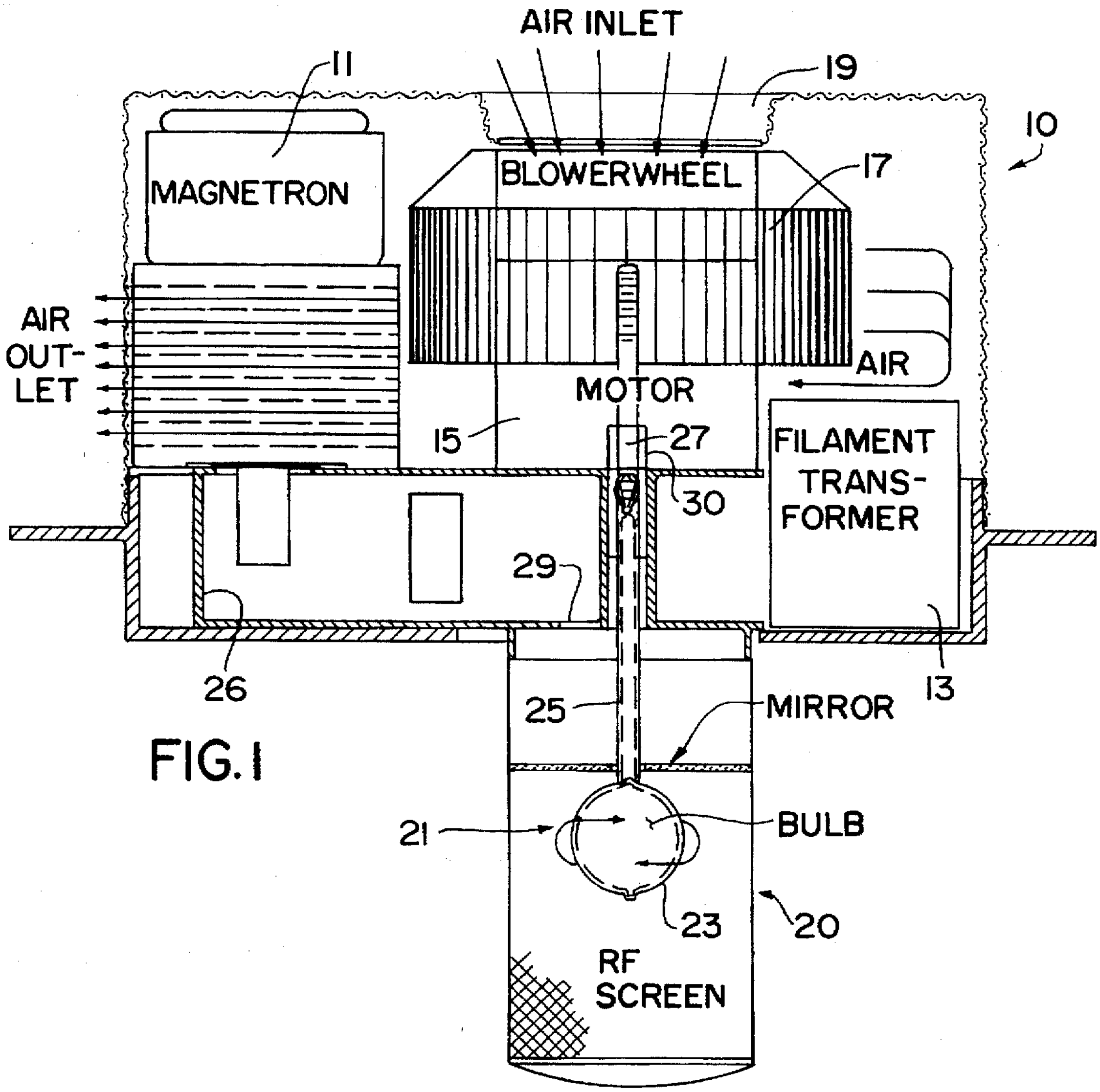
FIG. 1 is a partially diagrammatic view in longitudinal section of a lamp assembly employing a shaft coupling according to the principles of the present invention.
Figure 2:
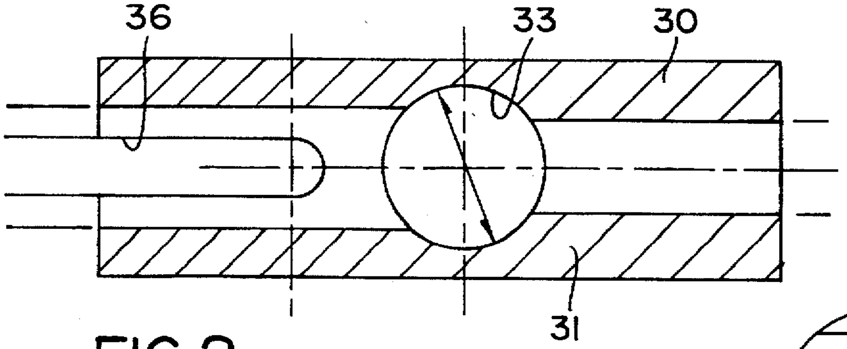
FIG. 2 is a view in longitudinal section of a coupling member employed in the assembly of FIG. 1.
Figure 3:
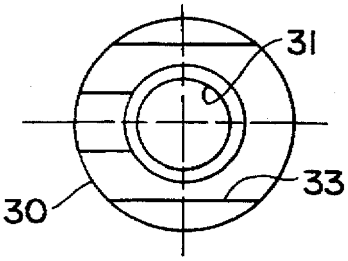
FIG. 3 is an end view of the coupling member of FIG. 2.
Figure 4:
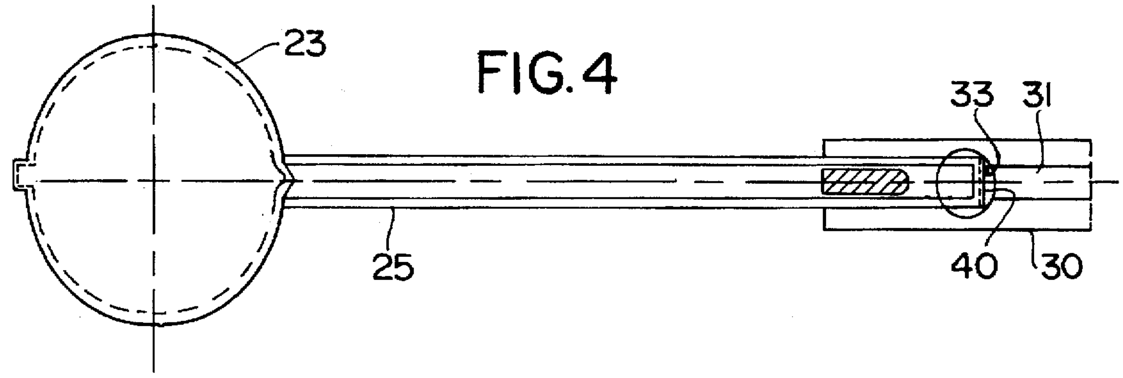
FIG. 4 is a side view of the coupling member of FIG. 2 secured to the bulb illustrated in the assembly of FIG. 1.
Figure 5:
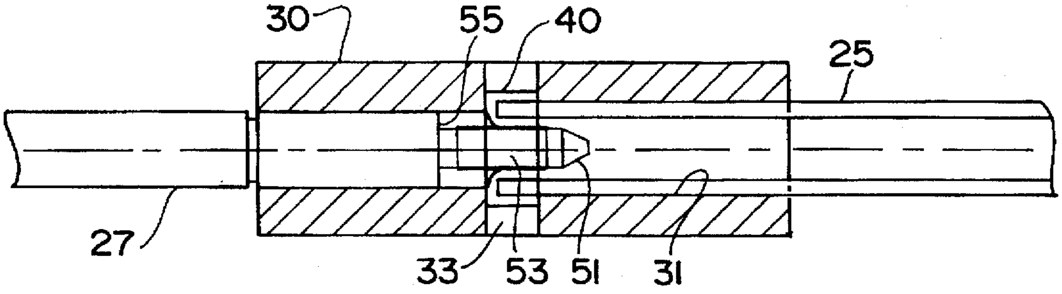
FIG. 5 is an enlarged view in longitudinal section of the coupling arrangement between the drive shaft and bulb illustrated in FIG. 1.
Figure 6:
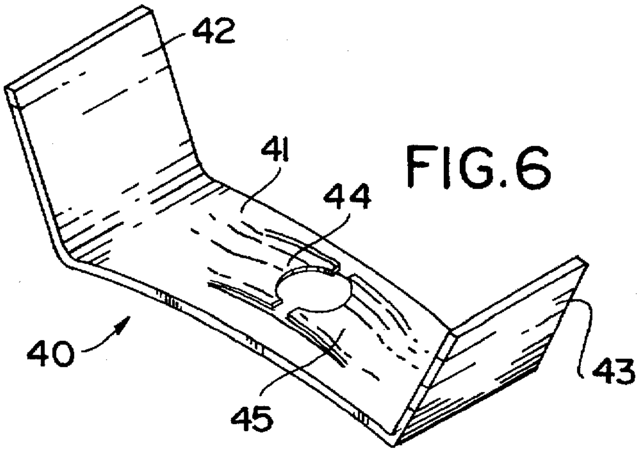
FIG. 6 is a view in perspective of a seating lock nut employed in the coupling arrangement of FIG. 5.

Referring specifically to FIG. 1, a lamp assembly utilizing the shaft coupling arrangement of the present invention includes a lamp module 10 comprising a housing for a magnetron 11 or other microwave source, a filament transformer 13 supplying filament current to the magnetron 11, and a motor 15 for rotating a bulb and for driving a cooling fan in the form of a blower wheel 17. An air inlet 19 for fan 17 is defined in one end of the housing.

A screen assembly 20 defines a microwave cavity wherein a bulb 21 is disposed. The bulb includes a generally spherical discharge envelope 23 supported at the distal end of an elongate cylindrical stem 25. The stem is secured at its proximal end to a drive shaft 27 of a motor 15 by means of a coupling member 30 to permit the bulb 21 to be rotated about the longitudinal axis of its stem 25. Bulb 21 has a fill material contained in its discharge envelope such as, for example, the material described in U.S. Pat. No. 5,404,076 (Dolan et al). The bulb is made of quartz or other suitable material. Microwave energy generated by magnetron 11 is fed by a waveguide 26 to a coupling slot 29 providing ingress to the microwave cavity defined by screen unit 20.

Referring to FIGS. 2–6, the proximal end of bulb stem 25 is inserted into the distal end of a central longitudinal throughbore 31 defined in generally cylindrical coupling member 30. Coupling member 30 is preferably made of a metal (e.g., stainless steel), but may be plastic, and also has a cross-hole 33 drilled or molded diametrically therethrough at a location at or near the longitudinal midpoint of the coupling member. Coupling member 30 has a planar proximal end 35 and a distal end 37 with a notch 36. The distal end of bore 31 has a contour adapted to slidably receive the proximal end of stem 25 which is secured in place in the bore by means of suitable adhesive such as silicone rubber. When thusly secured the proximal tip of stem 25 is disposed at the intersection of bore 31 and cross-hole 33. The proximal end of bore 31 (i.e., the portion of the bore extending proximally from cross-hole 33) is contoured to slidably receive a motor drive shaft 27 in the manner described below. In the illustrated embodiment, longitudinal bore 31 is cylindrical with a slightly larger diameter on the distal side of cross-hole 33 (i.e., to receive stem 25) than on the proximal side of the cross-hole (i.e., to receive drive shaft 27).

A seating lock nut 40 is disposed within coupling member 30. Lock nut 40 is a spring metal lock nut (i.e., a seating lock) which may be stamped and heat-treated and is preferably of the type manufactured by Tinnerman Products, Inc. as a "W" type single thread self-locking fastener. It is typically formed initially from flat spring metal (e.g, copper or steel) stock of generally rectangular shape and machined, stamped or otherwise processed to provide a bowed rectangular center section 41 bounded by bent edges or wings 42, 43 at opposite ends of the long dimension of the rectangle. The bend to form each wing is approximately eighty degrees toward the convex side of the bowed center section 41. A cut-out portion of center section 41 includes a pair of tongues 44, 45 extending generally toward one another from the cut-out edge along the longer dimension of the rectangular nut 40. The tongues 44, 45 are bent at a small angle through the cut-out beyond the convex surface of the center section, with tongue 44 being bent slightly more than tongue 45. The tips of the tongues are arcuately recessed and positioned to provide segments of a single female thread capable of engaging a suitably threaded screw inserted between the tongues in a direction generally perpendicular to center section 41.

Nut 40 is inserted through the cross-hole into bore 31. When properly inserted, nut 40 is oriented with wings 42, 43 and the convex surface of center section 41 facing distally, or toward the proximal end of bulb stem 25. Upon insertion into the coupler, nut 40 is loosely retained within the coupler by the bulb stem and by the dimensional limitations of bore 31 and cross-hole 33. Specifically, wings 42, 43 extend along opposite sides of the bulb stem and are thereby precluded by the stem from substantial lateral movement relative to bore 31 (i.e., longitudinally within cross-hole 33). Since the wings are slightly spaced from stem 25, some laterel movement is possible, in fact desirable, but the freedom of this movement is not sufficient to permit the nut to escape from coupler 30. In addition, the length of nut 40, extending longitudinally in cross-hole 33, is greater than the diameter of bore 31, but the width of the nut is slightly shorter than the diameter of cross hole 33. Thus, the nut can rotate through a few degrees in either direction about the axis of bore 31. Since the nut length is greater than the bore diameter, so that parts of the nut extend into the cross-hole, the nut can only rotate slightly about the bore hole axis.

The distal end 51 of drive shaft 27 is pointed or tapered, preferably in conical or frusto-conical form, and is followed by a threaded segment 53. The threads in segment 53 are sized to engage the single female thread defined by tongues 44, 45 of nut 40. Proximally of threaded section 53, the drive shaft 27 has a shoulder 55 of an outside diameter that closely matches the inside diameter of the proximal end of bore 31. Drive shaft 27 also has a circumferential groove 57; a clip ring 59 fits snugly within the groove 57. A close annular fit between the low friction drive shaft 27 and low friction coupler 30 assures proper radial alignment therebetween.

In securing the coupler 30 to the drive shaft 27, the coupler, with the bulb secured thereto, is moved into the housing of assembly 10 so that the distal tip 51 of the drive shaft is inserted into the proximal end of the coupler. Upon reaching the concave surface of lock nut 40, the tapered end of the drive shaft is guided through the cut-out portion of the nut center section 41 and between the tongues 44, 45. More specifically, the loosely retained nut 40, even if initially not centered with respect to the longitudinal axis of bore 31, positionally adapts itself into concentric orientation relative to the drive shaft as the drive shaft continues to be further inserted into bore 31. Upon threaded segment 53 reaching the single female thread defined by tongues 44, 45, the coupler is appropriately rotated so that the coupler and drive shaft are threadedly engaged.

By using a loosely retained (i.e., captive) nut rather than internally threading coupler 30, the present invention permits the female threads to float with respect to the coupler 30 to allow for and accommodate either angular or eccentric misalignment of the thread with respect to the cylindrical portion of the motor shaft. The annular clearance between the cylindrical portion of the motor shaft and the proximal cylindrical bore section is kept very low, on the order of a few tenths of a thousandth of an inch, in order to assure repeated positionability of the bulb. If these tolerances were imposed on the threaded segments, the cost of manufacture would be unreasonable.

In use, the shaft distal end 51 is pushed into the lock nut tongues 44, 45 until contact is made with threaded segment 53; this causes initial engagement between the shaft threaded segment 53 and the lock nut tongues 44, 45. The shaft 27 is then rotated to further advance engagement of the threads and further spread the tongues 44, 45 up to an engagement limit. The engagement limit is reached when the clip ring 59 in groove 57 has "bottomed out" against the distal end 35 of the coupling member 30. As the engagement limit is reached, lock nut tongues 44, 45, being spring metal, deform by buckling slightly and exert force in the proximal direction against the threaded segment 53.

Thus, an additional advantage of using the loosely retained seating lock nut 40 is that the tongues 44, 45 deform; this deformation adds a locking component to the assembly by causing the threads in segment 53 of the shaft to pull proximally on the tongues. This eliminates any longitudinal clearance or play between the shaft threaded segment 53, cross hole 33 and the nut 40 and places a compressive pre-stress on the mechanical joint therebetween.

As noted above, the drive shaft 27 and coupling member 30 can be brought together axially and secured together without the need to provide radial access to the coupling interface area in order to tighten set screws or other fasteners. This permits the design of a lamp assembly with a sealed barrier between the microwave cavity and ambient environment without the need for additional seals in the bulb attachment access holes, thereby reducing manufacturing costs significantly.

The foregoing describes the preferred embodiments of the present invention along with a number of possible alternatives. A person of ordinary skill in the art will recognize that modifications of the described embodiments may be made without departing from the true spirit and scope of the invention. The invention is therefore not restricted to the embodiments disclosed above, but is defined in the following claims.

I claim:

1. An apparatus for selectively coupling a rotatable lamp bulb to a rotating motor, comprising:

a rotatable motor shaft having a distal end, said shaft including fastening means;

a bulb stem having a proximal end;

a coupler having an open proximal end, an open distal end and a longitudinal throughbore extending from said open proximal end to said open distal end, said coupler having a cross-hole defined diametrically therethrough in intersecting relation with said throughbore;

wherein said bulb stem proximal end is secured to said coupler within said coupler throughbore and extends externally of said coupler through said coupler distal end;

a lock nut having a receiving means, said nut being positioned within said cross-hole; and wherein said motor shaft extends through said coupler proximal end and is positioned within said coupler longitudinal throughbore, when the distal end of said shaft extends into said locknut to engage said motor shaft fastening means with said lock nut receiving means.

2. An apparatus for selectively coupling a rotatable lamp bulb to a rotating motor, comprising:

a rotatable motor shaft having a distal end, said shaft including a threaded segment;

a coupler having a proximal end, a distal end and a longitudinal bore extending from said proximal end to said distal end;

said coupler having a cross-hole defined diametrically therethrough in intersecting relation with said bore;

a bulb stem having a proximal end;

wherein said bulb stem proximal end is secured to said coupler within said bore through said coupler distal end and extends into said cross-hole;

a lock nut having a cut-out central section with at least one resilient tongue, said nut being loosely retained within said cross-hole; and wherein said motor shaft is positioned within said coupler longitudinal bore through said bore proximal end and extends into said lock nut cut-out central section to engage said motor shaft threaded segment with said lock nut tongue and fixedly position said lock nut in said cross-hole.

3. The apparatus of claim 2, wherein:

said coupler longitudinal bore has a first diameter;

said coupler cross-hole has a second diameter; and said lock nut has a length greater than said first diameter and a width less than said second diameter.

4. The apparatus of claim 3, wherein said lock nut has first and second bent, resiliently deformable ends extending along opposite sides of the bulb stem.

5. The apparatus of claim 2, wherein said lock nut includes first and second opposing resilient tongues in said cut-out central section.

6. The apparatus of claim 2, wherein said motor shaft distal end is tapered in a frusto-conical form.

7. The apparatus of claim 2, wherein said motor shaft distal end is tapered in a conical form.

8. The apparatus of claim 2, wherein said lock nut is made from flat spring metal stock.

9. The apparatus of claim 8, wherein said metal is steel.

10. An apparatus for selectively coupling a rotatable lamp bulb to a rotating motor, comprising:

a rotatable motor shaft having a distal end tapered with a generally frusto-conical form, said shaft including a threaded segment adjacent said distal end;

a coupler having a proximal end, a distal end and a longitudinal bore running from said proximal end to said distal end; said coupler having a cross-hole defined diametrically therethrough in intersecting relation with said bore; wherein said bore has a first diameter and said cross-hole has a second diameter;

a bulb stem having a proximal end;

wherein said bulb stem proximal end is inserted into said bore from said coupler distal end and extends into said cross-hole;

a metal lock nut having a cut-out central section with first and second opposing resilient tongues; wherein said lock nut has a length greater than said first diameter and a width less than said second diameter;

wherein said nut is loosely retained within said cross-hole and has first and second resiliently deformable ends extending along opposite sides of the bulb stem;

wherein said motor shaft is positioned within said coupler longitudinal bore and extends through said longitudinal bore proximal end and into said lock nut cut-out central section to engage said motor shaft threaded segment with said lock nut tongues and fixedly position said lock nut relative to said coupler.

11. A method for selectively coupling a rotatable lamp bulb to a rotating motor, comprising the steps of:

forming a threaded segment proximate a distal end of a rotatable motor shaft;

boring a longitudinal bore in a coupler having a proximal end and a distal end, wherein said bore extends from said proximal end to said distal end;

drilling a cross-hole diametrically through said coupler which intersects with said bore;

forming a bulb stem with a proximal end;

forming a metal lock nut having a cut-out central section with first and second opposing resilient tongues and with first and second bent, resiliently deformable ends;

inserting said nut within said cross-hole;

inserting said bulb stem proximal end into said bore from said coupler distal end to extend into said cross-hole, whereby said lock nut deformable ends extend along opposite sides of said bulb stem;

inserting said motor shaft through said coupler longitudinal bore proximal end and into said lock nut cut-out central section thereby engaging said motor shaft threaded segment with said lock nut tongues.

12. The method of claim 11, wherein the step of inserting said bulb stem proximal end into said bore is preceded with application of adhesive to one of said stem and said bore.

13. The method of claim 11, further including the step of locking the motor shaft into the lock nut tongues by rotating the shaft to advance said motor shaft threaded segment up to an engagement limit, thereby causing threads on the threaded segment to pull proximally on the tongues.

14. The method of claim 13, further including:

forming a circumferential groove in said shaft;

mounting a clip ring in said circumferential groove;

detecting the engagement limit by determining that said clip ring has bottomed out on said coupler proximal end.

* * * * *